United States Patent
Puttmann

(10) Patent No.: US 11,268,324 B2
(45) Date of Patent: Mar. 8, 2022

(54) GROUND DRILLING DEVICE, METHOD FOR THE PRODUCTION AND USE THEREOF

(71) Applicant: TRACTO-TECHNIK GmbH & Co. KG, Lennestadt (DE)

(72) Inventor: Franz-Josef Puttmann, Lennestadt (DE)

(73) Assignee: TRACTO-TECHNIK GmbH & Co. KG, Lennestadt (DE)

( * ) Notice: Subject to any disclaimer, the term of this patent is extended or adjusted under 35 U.S.C. 154(b) by 0 days.

(21) Appl. No.: 16/624,515

(22) PCT Filed: Jun. 20, 2018

(86) PCT No.: PCT/EP2018/066467
§ 371 (c)(1),
(2) Date: Dec. 19, 2019

(87) PCT Pub. No.: WO2018/234401
PCT Pub. Date: Dec. 27, 2018

(65) Prior Publication Data
US 2021/0156199 A1    May 27, 2021

(30) Foreign Application Priority Data

Jun. 20, 2017   (DE) .......................... 102017005767.2

(51) Int. Cl.
*E21B 4/14*   (2006.01)
*F16B 11/00*   (2006.01)

(52) U.S. Cl.
CPC ............ *E21B 4/145* (2013.01); *F16B 11/008* (2013.01)

(58) Field of Classification Search
CPC ................................... E21B 4/145; E21B 7/26
See application file for complete search history.

(56) References Cited

U.S. PATENT DOCUMENTS

| 4,284,147 A | 8/1981 | Jenne |
| 4,462,468 A | 7/1984 | Jenne |
| 4,938,297 A * | 7/1990 | Schmidt ................. E21B 4/145 173/133 |
| 5,010,965 A * | 4/1991 | Schmelzer .......... E21B 47/0232 175/19 |
| 6,050,347 A * | 4/2000 | Jenne ........................ E21B 4/14 173/17 |
| 6,269,889 B1 | 8/2001 | Wentworth |

(Continued)

FOREIGN PATENT DOCUMENTS

| DE | 27 56 567 A1 | 6/1979 |
| DE | 30 26 456 U1 | 1/1981 |

(Continued)

*Primary Examiner* — Shane Bomar
(74) *Attorney, Agent, or Firm* — Howard IP Law Group, P.C.

(57) ABSTRACT

A ground drilling device with a percussion piston for drilling into the soil, comprising at least one housing section for the percussion piston, wherein an insert is arranged in the housing between the drilling head tip and the percussion piston such that the insert transmits at least a portion of the energy of the percussion piston to the housing, and the insert is held in the housing by means of a shrinking adhesion connection.

14 Claims, 4 Drawing Sheets

(56) References Cited

U.S. PATENT DOCUMENTS

| | | | |
|---|---|---|---|
| 6,406,215 B1 * | 6/2002 | Balve | E21B 4/145 |
| | | | 285/305 |
| 6,588,315 B2 | 7/2003 | Jenne | |
| 7,954,565 B2 * | 6/2011 | Puttmann | E21B 17/043 |
| | | | 175/320 |
| 9,016,404 B2 | 4/2015 | PüTtmann | |
| 9,328,560 B2 * | 5/2016 | Puttmann | E21B 17/03 |
| 10,828,763 B2 * | 11/2020 | Puttmann | B25D 9/12 |
| 2004/0112638 A1 * | 6/2004 | Hofmann | E21B 7/26 |
| | | | 175/19 |
| 2009/0283285 A1 * | 11/2009 | Randa | E21B 4/145 |
| | | | 173/212 |
| 2012/0111635 A1 * | 5/2012 | Caffell | E21B 25/08 |
| | | | 175/58 |
| 2015/0276104 A1 * | 10/2015 | Chen | F16L 13/103 |
| | | | 285/81 |
| 2017/0334052 A1 | 11/2017 | Püttmann et al. | |
| 2020/0224507 A1 * | 7/2020 | Radtke | E21B 33/1277 |

FOREIGN PATENT DOCUMENTS

| | | |
|---|---|---|
| DE | 3124524 A1 | 1/1983 |
| DE | 199 60 510 C1 | 5/2001 |
| DE | 10 2009 038 383 A1 | 3/2011 |
| DE | 10 2014 016 154 A1 | 5/2016 |

\* cited by examiner

GROUND DRILLING DEVICE, METHOD FOR THE PRODUCTION AND USE THEREOF

CROSS-REFERENCE TO RELATED APPLICATIONS

This application is a national stage application under 35 U.S.C. § 371 of International Patent Application No. PCT/EP2018/066467 filed Jun. 20, 2018, which claims priority to German Patent Application No. 10 2017 005 767.2 filed Jun. 20, 2017, the subject matter of which are incorporated by reference herein in their entireties for all purposes.

FIELD OF INVENTION

The invention relates to a ground drilling device, a method for producing a ground drilling device, and use of a joining process for the joining of an insert.

BACKGROUND

Ground drilling devices in the form of percussion drilling devices are known in the prior art and are used in particular for the production of horizontal earth boreholes. Percussion drilling devices are self-propelled drilling devices. Generally, such a percussion drilling device comprises a percussion piston, which is moved in oscillating manner (back and forth) inside a housing and thereby strikes against a front or rear impact surface of the housing, depending on the desired direction of movement of the percussion drilling device. The kinetic energy of the percussion piston which is transmitted in this way ensures an accelerating of the percussion drilling device within the soil.

Such a percussion drilling device is known for example from DE 10 2009 038 383 A1. The housing of the percussion drilling device known from DE 10 2009 038 383 A1 is made of two parts. In one part, i.e., the rear part, the percussion piston performs its oscillation. The other part, i.e., the front part, comprises the drilling head and is impacted by the percussion piston. The two parts are joined together by friction welding. Usually the rear part is a pipe made of structural steel, having a predetermined inner diameter for the production of a housing section of a percussion drilling device. The front part is usually made from a solid block and consists of high-quality steel, since the forces of the percussion piston are acting [on it]. After the friction welding, the friction welded seam must be machined out in costly manner so that the piston can be moved forward without any obstacle. After the machining of the friction weld seam, final machining of the outer contour of the housing is furthermore done so that all threads and other contour lie on the same axis.

DE 10 2014 016 154 A1 discloses a percussion drilling device in which an annular insert is held in a housing by means of a shrinking connection. This connection has the benefit of not needing a further machining—such as the machining of a friction weld seam—but the connection once made is hard to release once more.

SUMMARY

Now, the problem which the invention proposes to solve is to improve a ground drilling device and a method for production of a ground drilling device as well as a use of a joining process in such a way that a construction is made possible which enables an easier handling, also during maintenance and/or repair.

This problem is solved by the subject matter of the coordinated claims. Advantageous embodiments are proposed in the dependent claims and will emerge from the following specification of the invention.

The heart of the invention is to provide an insert in the impact section of the percussion piston in the housing, which reduces the open cross section of the housing in the region of the end of a drilling head tip which is struck by the percussion piston and which is held by means of a shrinking adhesion connection.

It has been discovered that a section of the housing which is struck by the percussion piston, and which may comprise the impact surface for the percussion piston, need not be held in the housing by means of a shrinkage connection, despite the large mechanical strain. According to the invention, the outer and inner contour of the percussion drilling apparatus can be produced separate from the insert which is installed or going to be installed, yet the oversized dimension otherwise needed for the shrinkage connection can be decreased. Thanks to a possible decreasing of the oversized dimension, the temperature difference otherwise needed for the joining of the insert in the housing can likewise be reduced. The temperatures only required in this way make possible a complete assembly of a front housing section already with all components, which is also very beneficial in regard to the costs during the manufacturing. The belief that a shrinkage connection is absolutely essential given the very large stresses during the impacting of the percussion piston on the insert has been done away with. Even though the insert is arranged in the housing in such a way that at least a portion of the energy of the percussion piston is transferred to the housing, it is possible to employ "only" a shrinking adhesion connection for the holding in the housing. The insert itself can have an impact surface for the percussion piston and in this way transfer the mechanical energy of the percussion piston impinging on the impact surface. The mechanical energy may also be transferred to the insert indirectly, for example by means of the drilling head or drilling tip, which is struck by the percussion piston. It has been realized that the shrinking adhesion creates a secure purchase and offers the aforementioned advantages, even though it was previously assumed that the large oversized dimension required for a pure shrinkage connection is required for the holding of the insert.

The shrinking adhesion connection requires a much smaller oversized dimension, unlike the shrinkage connection, which demands an enormous oversized dimension. The preconceived notion has been abandoned, that a shrinkage connection requires such a shrinkage with the enormous oversized dimension on account of the connection having to withstand millions of load reversals. Thanks to the less oversized dimension, only a lesser temperature difference is needed between the two structural elements being joined. The nature of the housing section and the insert, which usually consist of metallic material, is not influenced by the joining and in particular the nature of the housing section and the insert undergoes no damage. The slight temperature differences needed for the shrinking adhesion connection furthermore make it possible to connect a complete front drilling head housing or front housing with a drilling head tip, especially a drill bit, and further components such as compression spring and seals, to the housing section in a single process. Any tensile stresses occurring on the housing can be kept low and any compressive stresses occurring on the insert or the complete front housing can likewise be kept low. It is possible to design a shrinking adhesion connection such that the insert being joined remains substantially at room temperature, while the housing section is heated to around 250° C. With such a design of the shrinking adhesion connection, the glue can be applied to the unheated insert, remaining substantially at room temperature, and the insert can be introduced into the heated, enlarged part, especially the housing, so that the benefit may be afforded that the glue is forced into the smallest pores and the glue surface is thus enlarged. The shrinking adhesion connection can make it possible for the insert, once installed, to be removed and mounted once again as often as desired. As long as the housing is heated above the indicated temperature for the glue, the adhesive action of the glue will be destroyed and the glue may act as a lubricant in order to facilitate the disassembly. An adhesive which hardens in the absence of air can be used in the shrinking adhesion connection, so that a mounting or a connecting of the insert in the housing can also be possible, resulting in an easy handling. Thanks to the use of a shrinking adhesion connection the benefit can also be achieved that the inner diameter of a thin-walled front drilling head housing which is being shrink-fitted and glued is decreased less by the external pressure of the housing surrounding the insert. The possible damaging of the insert can be decreased. In this way, entire front drilling head housings can be used for the shrink fitting and gluing that have a thinner wall design, which is not possible for pure shrinkage. Hence, it is possible to use an insert and/or a front drilling head housing having a thinner wall and thus lower weight. The length of the shrinking adhesion connection can also be shortened, which may result in a shorter length of the ground drilling device. Thanks to the shrinking adhesion connection proposed by the invention, stresses in the insert, the front drilling head housing and/or the housing can be kept within the elastic range.

The term "shrinking adhesion connection" encompasses the combination of joining methods involving a simultaneous shrinking and gluing. Normally, single-component anaerobic adhesives are used. These can harden in the glue gap when the mating joint parts are metallic. The use of epoxy resins is possible and may result in greater strength. A shrinking adhesion connection may be characterized in that it does not require as large oversized dimensions or as precise tolerances as those for a shrinking connection. In particular, the glue may be applied to the colder of the two structural elements. The heated structural element shrinks upon cooling down and the residual heat may ensure a quick hardening. The heated structural part, especially the housing section, may be briefly heated in order to form the shrinking adhesion connection to temperatures up to around 350° C., preferably around 300° C., most especially preferably around 250° C. The other structural part, especially the insert, which is inserted into the housing section, can remain at room temperature.

The insert may be situated in the region of the impact surface for the percussion piston. Moreover, the insert may comprise the impact surface for the percussion piston of the percussion drilling apparatus. The corresponding housing section no longer needs any machining work after the insert is installed. The insert may also be connected rigidly or movably to the drilling head tip, and the drilling head tip may also comprise the impact surface for the percussion piston, which in turn transmits the mechanical energy of the percussion piston to the insert and thus to the housing.

By a "ground drilling device" is meant in particular any apparatus comprising a percussion piston and moving by impulses in an existing or yet to be created passage in order to produce or widen a borehole or to replace or clean an existing pipe in destructive or nondestructive manner, or to pull in conduits or other elongated bodies into existing pipes, as well as all devices used for construction work during underground tunneling. A ground drilling device according to the invention may be in particular a self-propelled impact apparatus for producing a horizontal drilling, most especially preferably a percussion drilling device.

The term "percussion drilling device" encompasses both soil displacement devices, in which the drilling head tip is firmly connected to the housing, and percussion drilling devices with axially mounted drilling head tip which is displaceable independently of the housing. The drilling head tip may be in particular a drill bit. A percussion drilling device according to the invention may be either a single-stroke device or a two-stroke device. In a two-stroke device, the percussion piston at first strikes against the drilling head tip, which has run ahead in the first stroke. The housing is struck by the percussion piston in the second stroke. Tip resistance and casing friction are more easily overcome in a separate and alternating manner in a two-stroke device. In a two-stroke device there is a better energy conversion, which facilitates a better fragmentation of obstacles due to the concentration of the hammering impulse on the drilling head tip. Due to the soil displacement occurring ahead of the stroke path of the drilling head, the housing remains in a position of rest and thereby ensures a relatively good running stability.

The percussion drilling device in the sense of the invention is not confined to underground earth works. Thus, for example, conduits in which a ground drilling apparatus is operated may also run above the ground.

The term "horizontal drilling" in the sense of the present invention encompasses in particular every kind of existing or yet to be produced preferably horizontal channel in a body, especially earth passages, including earth boreholes, rock boreholes, or earth conduits as well as underground and aboveground pipelines and sewage channels, which can be produced, widened, destroyed, cut open or cleaned by a corresponding percussion drilling device.

The term "insert" is not confined to a particular form, especially the classical annular form. Thus, it may also have a form other than a circular form, or be interrupted. In particular, the insert may have an outer contour shape which corresponds substantially to the inner contour shape of the section in which the insert is installed. It may be provided that the outer contour shape of the insert has an envelope surface which corresponds substantially to the inner contour shape of the section in which the insert is installed. In particular, the insert may have an opening, preferably one situated at the center.

The insert may have an outer contour comprising a larger dimension than a corresponding dimension of the inner contour of the housing section without the insert being situated in the housing section. The insert may be introduced into the housing section by creating a temperature difference between the insert and the housing section, so that the inner diameter is temporarily enlarged and/or the outer contour is temporarily decreased. Preferably, the housing section will be heated.

Advantageously, the section in which the insert is held has a circular diameter. This can simplify the manufacturing, since the insert can be installed in a manner which is rotation-invariant to the section. A preferential position is not necessary for the installing of the insert.

The insert may be designed in particular as part of drilling head housing or it may be separate from this. The insert may be situated at the end face on the drilling head housing. In particular, the insert may be situated at the end face in the housing section of the drilling head or the drilling head tip. The insert situated at the end face in the housing section may be installed prior to the housing section for the percussion piston.

The invention also creates a method for producing a ground drilling device having a percussion piston for drilling into the soil. An insert is arranged in a housing between the drilling head and the percussion piston such that the insert transmits at least a portion of the energy of the percussion piston to the housing. A shrinking adhesion connection is produced between the insert and the housing section.

In a preferred embodiment of the method, an anaerobic adhesive is the adhesive applied to the insert.

In a preferred embodiment, the insert is held basically at room temperature when installing the insert in the housing.

The invention also creates a use of a joining process for the joining of an insert in a housing section for a percussion piston of a ground drilling device for drilling in the soil. A shrinking adhesion connection is used as the joining process.

The specification of the individual aspects of the invention in the form of the ground drilling device, the method for production of the ground drilling device and the use of a joining process should be understood to complement one another. Embodiments in the specification regarding one of the aspects also apply to the other aspects.

The preceding remarks, as well as the following specification of exemplary embodiments, do not constitute an abandonment of any given embodiments or features.

BRIEF DESCRIPTION OF THE DRAWINGS

The invention shall be explained more closely below with the aid of an exemplary embodiment presented in the drawings. The drawings show.

DETAILED DESCRIPTION

Figure 1:
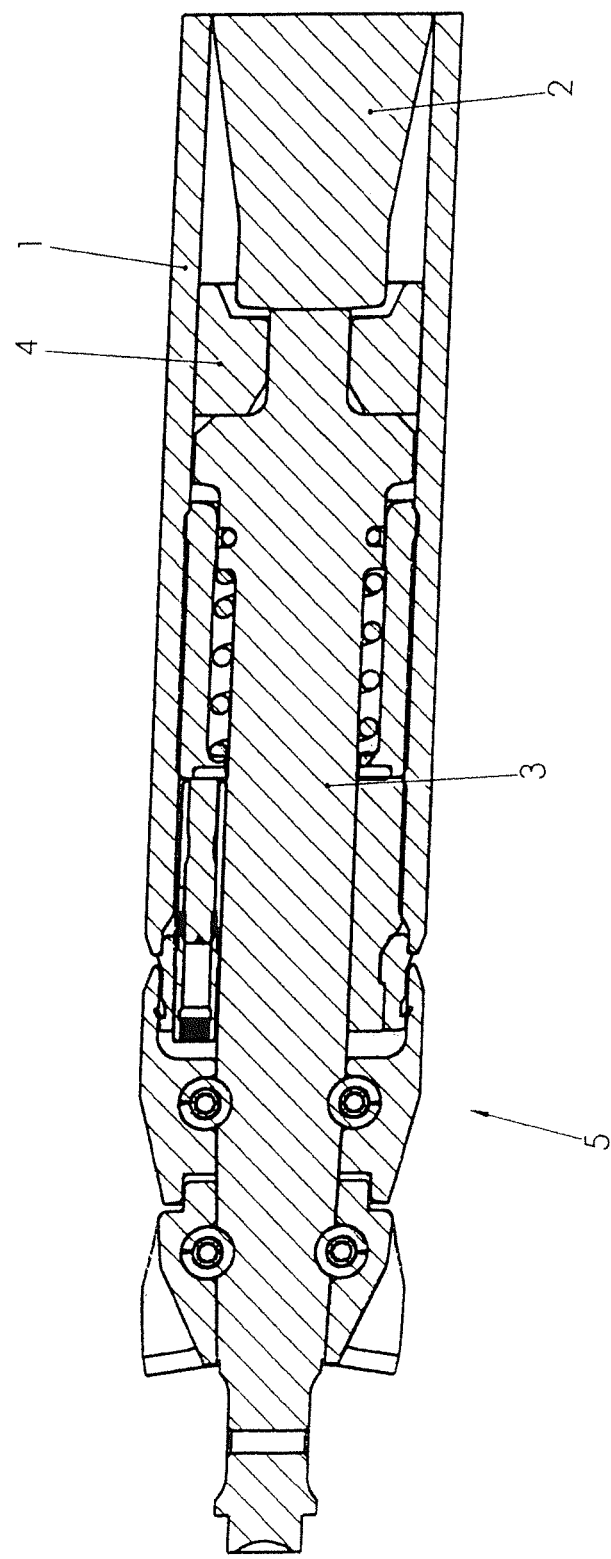
FIG. 1 a front region of a percussion drilling device according to the invention in a sectional side view in a first embodiment.

FIG. 1 shows the front region of a percussion drilling device according to the invention in a sectional side view. FIG. 1 shows a first embodiment. In this section, the percussion drilling device comprises a housing 1, in which a percussion piston 2 is movably mounted in oscillation. The percussion piston 2 is placed in the oscillating motion in known manner by means of compressed air, which is supplied to the percussion drilling device at its rear end (not shown) via a compressed air line, whereupon the percussion drilling device in drilling operation impinges on a front impact surface in each cycle of its motion.

The percussion drilling device shown in FIG. 1 is a 2-cycle percussion drilling device. The percussion piston 2 strikes in two stages, first against a drilling head tip 3, having the design of a drill bit, and then against an insert 4 in the housing 1. The drilling head tip 3 is mounted in the drilling head 5 in axially displaceable manner, independently of the housing 1. One end of the drilling head tip 3 extends through a reduced cross section in the interior of a section of the housing 1 which is formed by the insert 4. The insert 4 comprises the impact surface for the percussion piston 2. The impact surface is configured as the base surface of a conically tapering cavity in the insert 4.

The housing 1 has a circular inner contour in the section with the insert 4, having an inner diameter. The insert 4 has a circular outer contour having an outer diameter. The insert 4 is somewhat larger in outer diameter than the inner diameter of the housing 1, as long as the insert 4 and the housing 1 are at the same temperature in the region of the section under consideration. In order to introduce the insert 4 into the housing 1, the housing 1 is heated and the insert 4 is held substantially at room temperature and an adhesive is applied to the insert. A shrinking adhesion connection is produced. The insert 4 may thus be placed at the desired position in the housing 1. After the cooldown of the housing 1 and the insert 4 to the same temperature, the insert 4 is fixed in its position relative to the housing 1.

The drilling head 5 may correspond to the drilling head of a percussion drilling device as disclosed in WO 2011/128045 A2. In this regard, reference is made to WO 2011/128045 A2 in its entirety.

Figure 2:
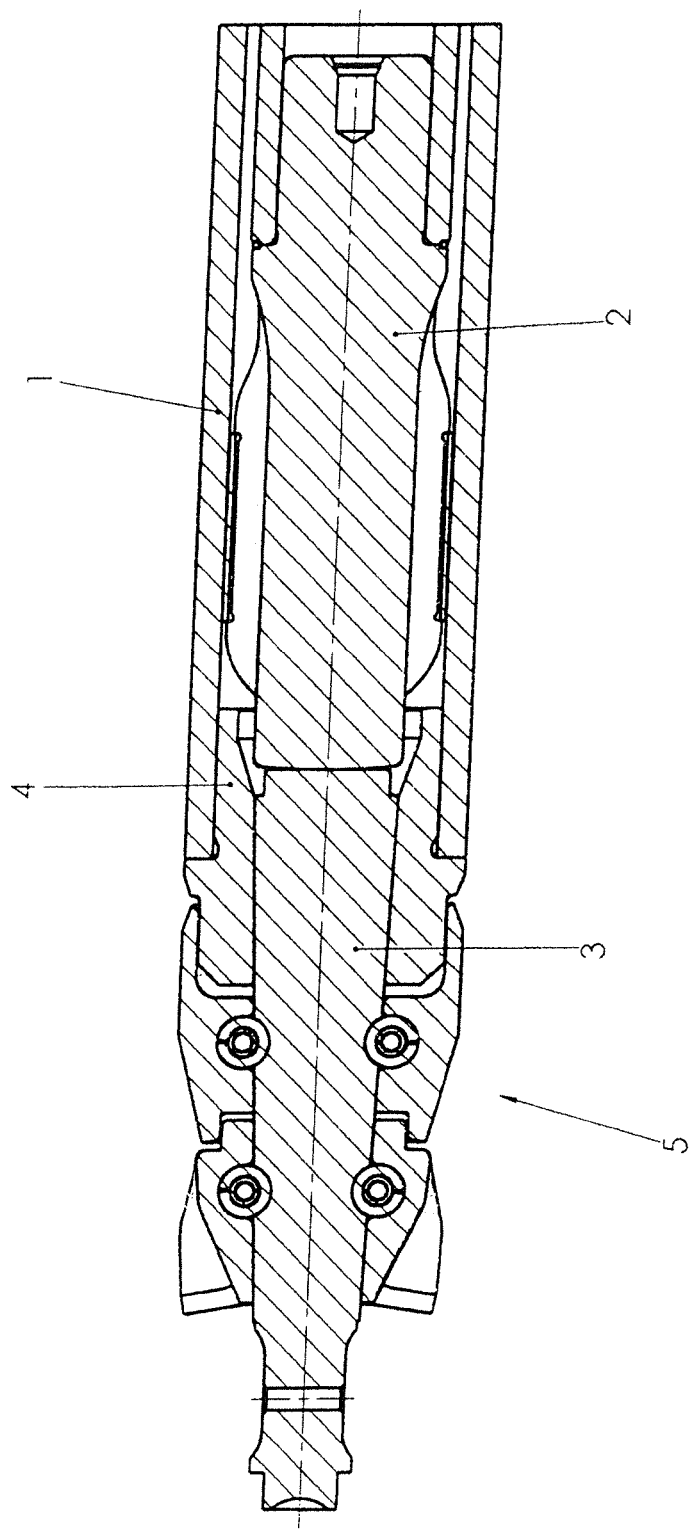
FIG. 2 a front region of a percussion drilling device according to the invention in a sectional side view in a second embodiment.

FIG. 2 shows an alternative embodiment with a drilling head 5 inserted into the housing 1 at the end face and having an insert 4 which has been installed in the housing 1 in order to reduce the cross section and to form an impact surface for the percussion piston 2. The insert 4 has been shrink-fitted and glued in the end section of the housing 1. The drilling head tip 3 extends by one end through the insert 4. The drilling head tip 3 is guided at the end face and comprises an impact surface for the percussion piston 2. The embodiment shown in FIG. 2 works by the single-stroke principle.

Figure 3:
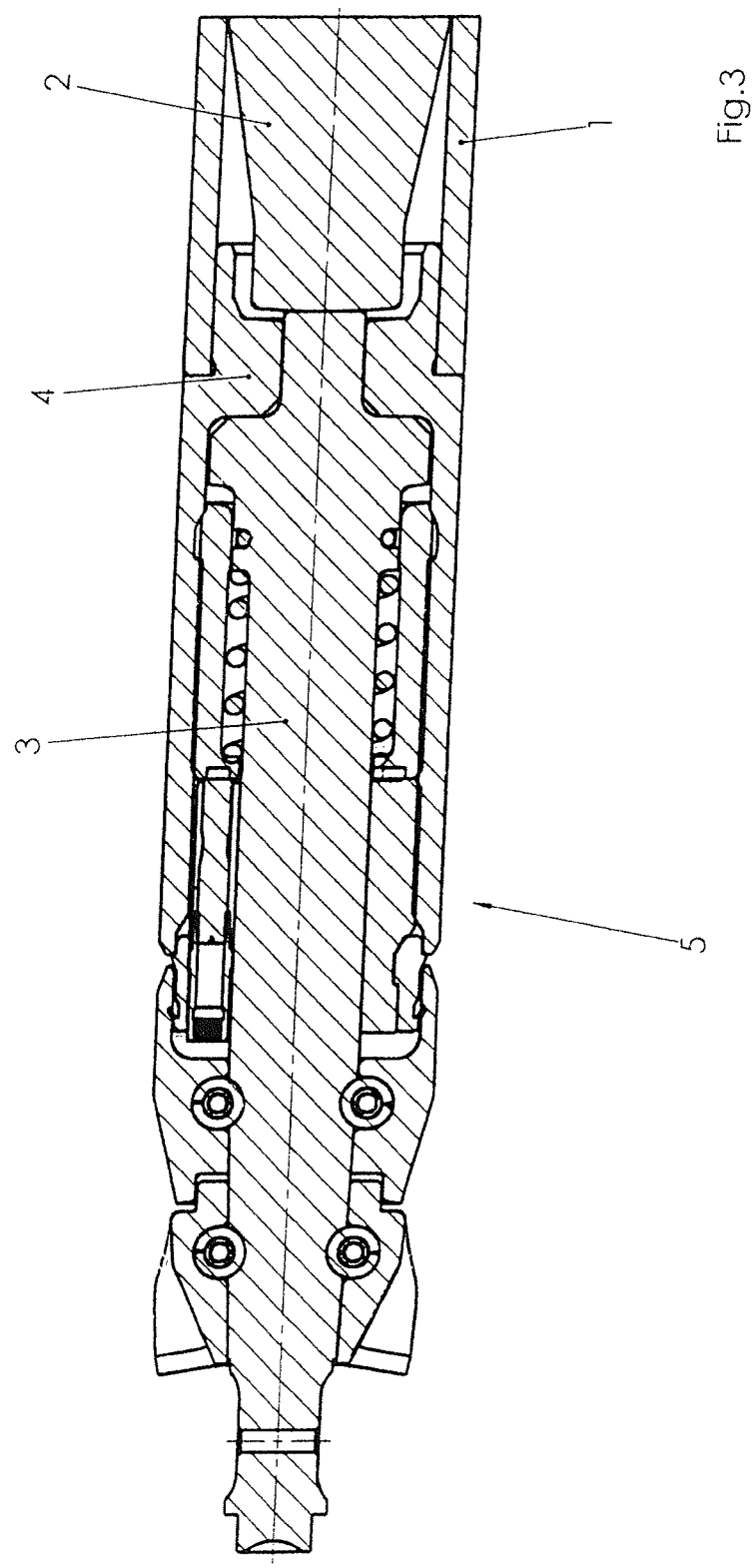
FIG. 3 a front region of a percussion drilling device according to the invention in a sectional side view in a third embodiment.

FIG. 3 shows an alternative embodiment in which an insert 4 has been installed at the end face in the housing 1, being part of a drilling head 5. The insert 4 of FIG. 3 is the end section of a shrink-fitted and glued front housing or drilling head, having a drilling head tip 3 mounted in axially displaceable manner independently of the housing 1. The embodiment shown in FIG. 3 works by the two stroke principle. The insert 4 and the drilling head tip 3 each comprise an impact surface for the percussion piston 2, against which the percussion piston 2 impinges successively in time during a forward movement. Regarding the design of the drilling head 5 of the embodiment shown in FIG. 3, reference is made to WO 2011/128045 A2 in its entirety.

Figure 4:
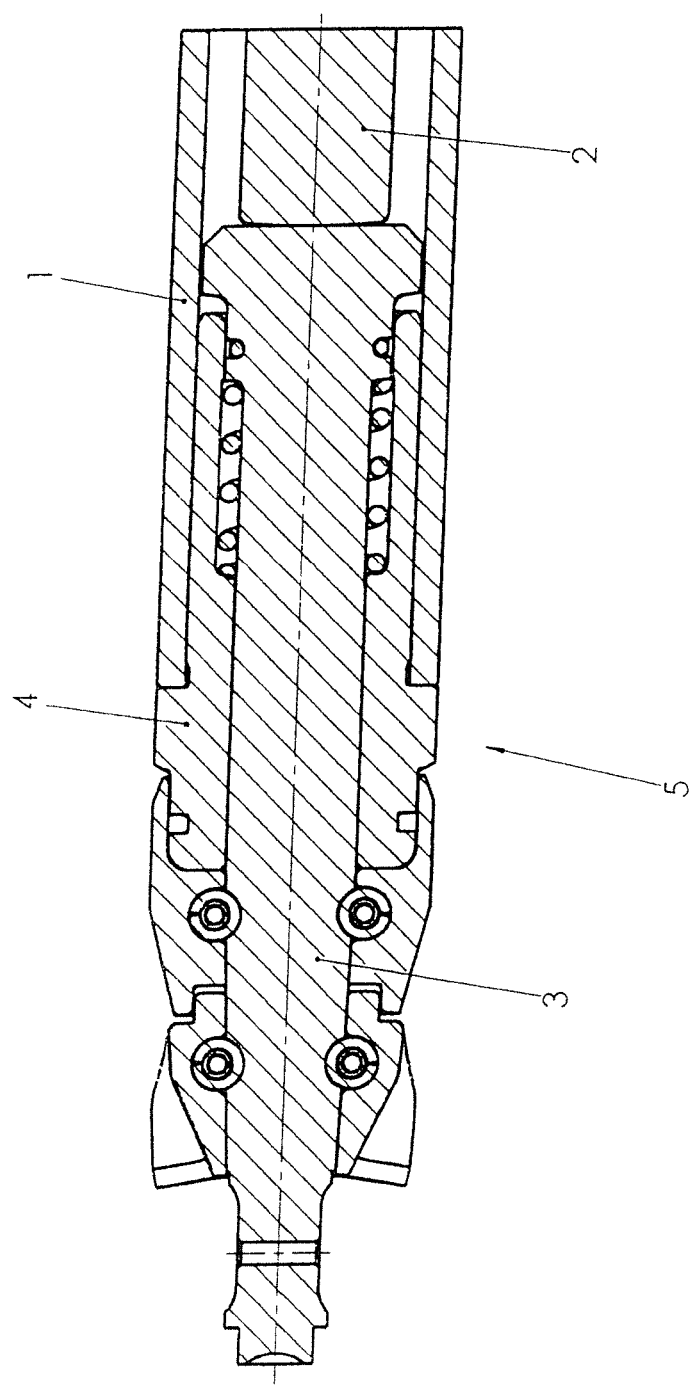
FIG. 4 a front region of a percussion drilling device according to the invention in a sectional side view in a fourth embodiment.

FIG. 4 shows an alternative embodiment in which an insert 4 has been installed at the end face in the housing 1, being part of a drilling head 5. The insert 4 of FIG. 4 is the end section of a shrink-fitted front housing or the front housing of a drilling head 5, having a drilling head tip 3 mounted in axially displaceable manner independently of the housing 1. Between the drilling head tip 3 and the insert 4 there is arranged a compression spring, which is compressed during an impacting of the drilling head tip 3 by means of the percussion piston 2. The drilling head tip 3 has an impact surface for the percussion piston 2. Due to the impacting of the drilling head tip 3 by means of the percussion piston 2, the drilling head tip 3 can impinge against the insert 4, once the compression spring arranged between the drilling head tip 3 and the insert 4 has been at least partly compressed. The embodiment shown in FIG. 4 works by the two stroke principle. At first, the percussion piston 2 impinges against the drilling head tip 3. Thanks to the impulse transmitted by the percussion piston 2, the drilling head tip 3 impinges on the insert 4, after an adequate compression of the compression spring.

The invention claimed is:

1. Ground drilling device having a percussion piston for drilling into the soil, comprising
   at least one steel housing for the percussion piston, and
   a steel insert arranged in a section of the housing between a drilling head tip and the percussion piston such that the insert transmits at least a portion of the energy of the percussion piston to the housing, wherein the insert is held in the housing by a shrinking adhesion connection.

2. Ground drilling device according to claim 1, wherein the section in which the insert is arranged has a circular diameter.

3. Ground drilling device according to claim 1, wherein the shrinking adhesion connection includes an anaerobic adhesive.

4. Ground drilling device according to claim 1, wherein the insert is part of a front drilling head housing.

5. The ground drilling device of claim 1, wherein the insert is arranged around an adjacent end of the drilling head tip that is configured to be directly impacted by the percussion piston when the percussion piston is driven in the forward direction.

6. The ground drilling device of claim 1, wherein the insert is arranged forward of a shoulder defined at one end by an anvil end of the drilling head tip, the shoulder configured to directly impact the insert.

7. The ground drilling device of claim 1, wherein:
   the housing section has an internal contour, wherein, when the housing section and the insert are at the same temperature, and the insert is external to the housing section, the internal contour of the housing section is smaller than an outer contour of the insert.

8. The ground drilling device of claim 1, wherein the shrinking adhesion connection comprises a connection formed by heating the housing at a temperature between 250° C.–350° C.

9. The ground drilling device of claim 1, wherein the shrinking adhesion connection between the insert and the housing is configured to be released upon application of heat to the housing above a temperature at which an adhesive of the shrinking adhesion connection loses adhesion to facilitate removal of the insert from the housing.

10. The ground drilling device of claim 9, wherein the adhesive is configured to act as a lubricant to facilitate disassembly when the heat is applied to the housing above the temperature at which an adhesive of the shrinking adhesion connection loses adhesion.

11. Method for producing a ground drilling device having a percussion piston for drilling into the soil, comprising:
    arranging an insert in a housing between a drilling head and the percussion piston such that the insert transmits at least a portion of the energy of the percussion piston to the housing, wherein a shrinking adhesion connection is produced between the insert and the housing, the producing of the shrinking adhesion connection comprising heating the housing at a temperature between 250° C. and 350° C.

12. Method according to claim 11, wherein an anaerobic adhesive is the adhesive applied to the insert.

13. Method according to claim 11, wherein the insert is held substantially at room temperature when installing the insert in the housing.

14. The method of claim 11, wherein the shrinking adhesion connection further comprises applying adhesive to an exterior of the insert before arranging the insert in the housing, the insert being arranged in the housing after the housing has been heated to the temperature between 250° C.–350° C.

* * * * *